(12) United States Patent
Chuang et al.

(10) Patent No.: US 11,914,832 B2
(45) Date of Patent: Feb. 27, 2024

(54) MEMBRANE TOUCH PANEL DEVICE

(71) Applicant: TONG LUNG METAL INDUSTRY CO., LTD., Minxiong Township (TW)

(72) Inventors: Pai-Hsiang Chuang, New Taipei (TW); Ruei-Jie Jeng, Jhuci Township (TW); Chen-Ming Lin, Minsyong Township (TW); Ding-Sian Cai, Singang Township (TW); Chun-Yi Fang, Huwei Township (TW)

(73) Assignee: Tong Lung Metal Industry Co., Ltd., Minxiong Township (TW)

( * ) Notice: Subject to any disclaimer, the term of this patent is extended or adjusted under 35 U.S.C. 154(b) by 0 days.

(21) Appl. No.: 17/953,587

(22) Filed: Sep. 27, 2022

(65) Prior Publication Data

US 2023/0333702 A1  Oct. 19, 2023

(30) Foreign Application Priority Data

Apr. 14, 2022 (TW) .................................. 111114239

(51) Int. Cl.
*G06F 3/045* (2006.01)
(52) U.S. Cl.
CPC .... *G06F 3/045* (2013.01); *G06F 2203/04103* (2013.01)

(58) Field of Classification Search
None
See application file for complete search history.

(56) References Cited

U.S. PATENT DOCUMENTS

| 10,671,177 | B1* | 6/2020 | Ho | G02B 6/0055 |
| 2016/0299278 | A1* | 10/2016 | Liang | G02B 6/0035 |
| 2018/0082803 | A1* | 3/2018 | Winter | H01R 12/78 |

* cited by examiner

*Primary Examiner* — Amare Mengistu
*Assistant Examiner* — Sarvesh J Nadkarni
(74) *Attorney, Agent, or Firm* — Burris Law, PLLC (57) ABSTRACT

A membrane touch panel device includes a circuit board unit, a light-blocking frame plate, a plurality of light-blocking tabs, and an operation panel unit that are stacked along a front-rear direction. The circuit board unit includes a circuit board having a plurality of keypad circuits, and a plurality of LEDs being electrically connected to the circuit board. A light transmission rate of the circuit board ranges from 0% to 20%. The light-blocking frame plate is stacked on the circuit board, and defines a hollow section provided for the LEDs to protrude thereinto. The light-blocking tabs are connected to the light-blocking frame plate such that the light-blocking tabs respectively cover the LEDs. The operation panel unit is stacked on the light-blocking frame plate, and has a plurality of key segments being respectively aligned with the keypad circuits, and being adapted to permit light generated by the LEDs to pass therethrough.

19 Claims, 10 Drawing Sheets

MEMBRANE TOUCH PANEL DEVICE

CROSS-REFERENCE TO RELATED APPLICATION

This application claims priority to Taiwanese Invention Patent Application No. 111114239, filed on Apr. 14, 2022.

FIELD

The disclosure relates to an input device, and more particularly to a membrane touch panel device.

BACKGROUND

A membrane touch panel device is an input device that differs from the traditional push-button input devices and conventional touch panels; it has a thin and flat appearance similar to the conventional touch panels, yet provides a key-press-feel similar to the traditional push-buttons. Generally, an existing membrane touch panel device includes a circuit board that is provided with a plurality of keypad circuits, a plurality of LEDs that are disposed on the circuit board, and an operation panel that is stacked on a front side of the circuit board. The operation panel has a plurality of key sections, each of which permits light generated by the LEDs to pass forwardly therethrough in the shape of a symbol, and is pressable to trigger a corresponding one of the keypad circuits.

However, the existing membrane touch panel devices often have the problem of light leakage; that is, when the device is in use, a portion of the light generated by the LEDs will leak out from the gaps between the stacked panels and from the back surface and the peripheral edge of the circuit board, which can interfere with the light emitted from the key sections of the operation panel, especially when the device is used in a dark environment (e.g., at nighttime), and therefore compromise the visibility of the symbols on the key sections, as well as affect the overall quality of the device.

SUMMARY

Therefore, an object of the disclosure is to provide a membrane touch panel device that can alleviate at least one of the drawbacks of the prior art.

According to the disclosure, the membrane touch panel device includes a circuit board unit, an opaque light-blocking frame plate, a plurality of opaque light-blocking tabs, and an operation panel unit that are stacked along a front-rear direction. The circuit board unit includes a circuit board having a plurality of keypad circuits that are disposed on a front side of the circuit board, and a plurality of LEDs being electrically connected to the front side of the circuit board. A light transmission rate of the circuit board ranges from 0% to 20%. The light-blocking frame plate is stacked on the front side of the circuit board, and defines a hollow section provided for the LEDs to protrude forwardly thereinto. The light-blocking tabs are connected to a front side of the light-blocking frame plate such that the light-blocking tabs respectively cover the LEDs. The operation panel unit is fixedly stacked on the front side of the light-blocking frame plate, and has a plurality of key segments that are respectively aligned with the keypad circuits along the front-rear direction, and that are adapted to permit light generated by the LEDs and emitted through the hollow section to pass forwardly therethrough.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 1:
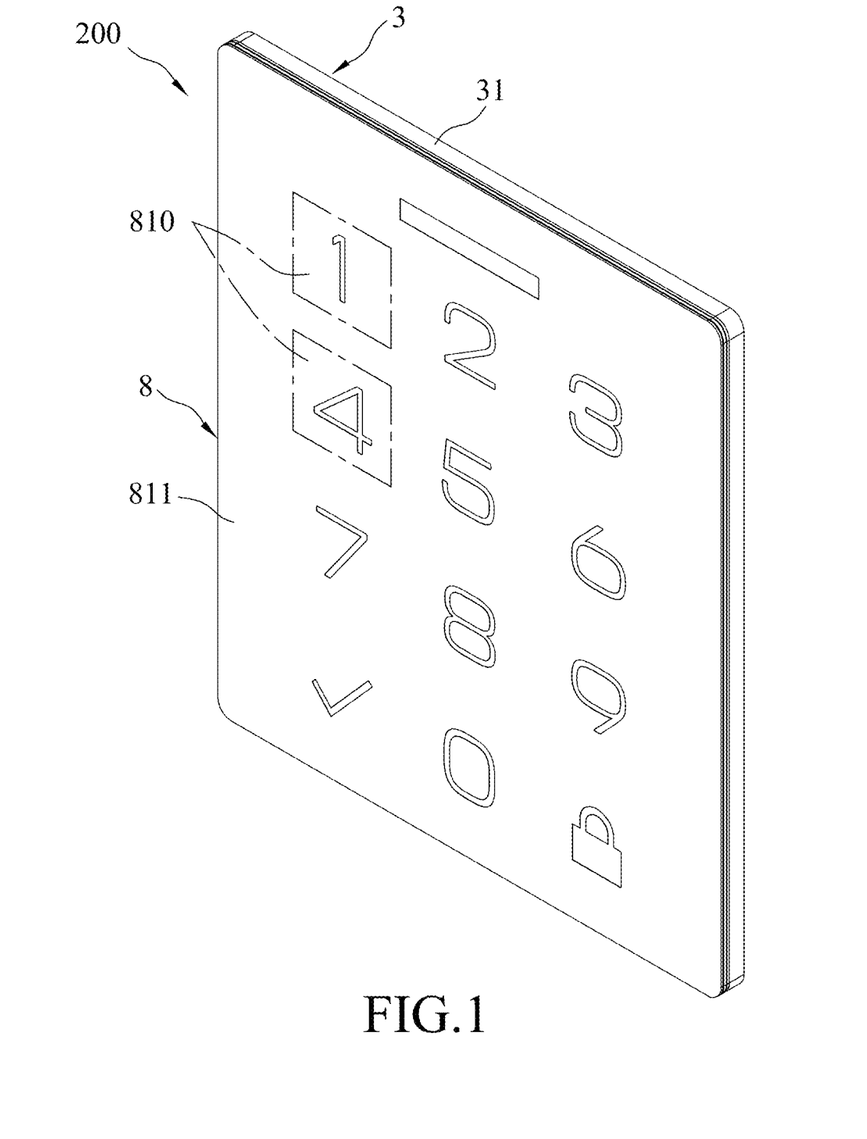
FIG. 1 is a perspective view of a first embodiment of a membrane touch panel device according to the disclosure.
Figure 2:
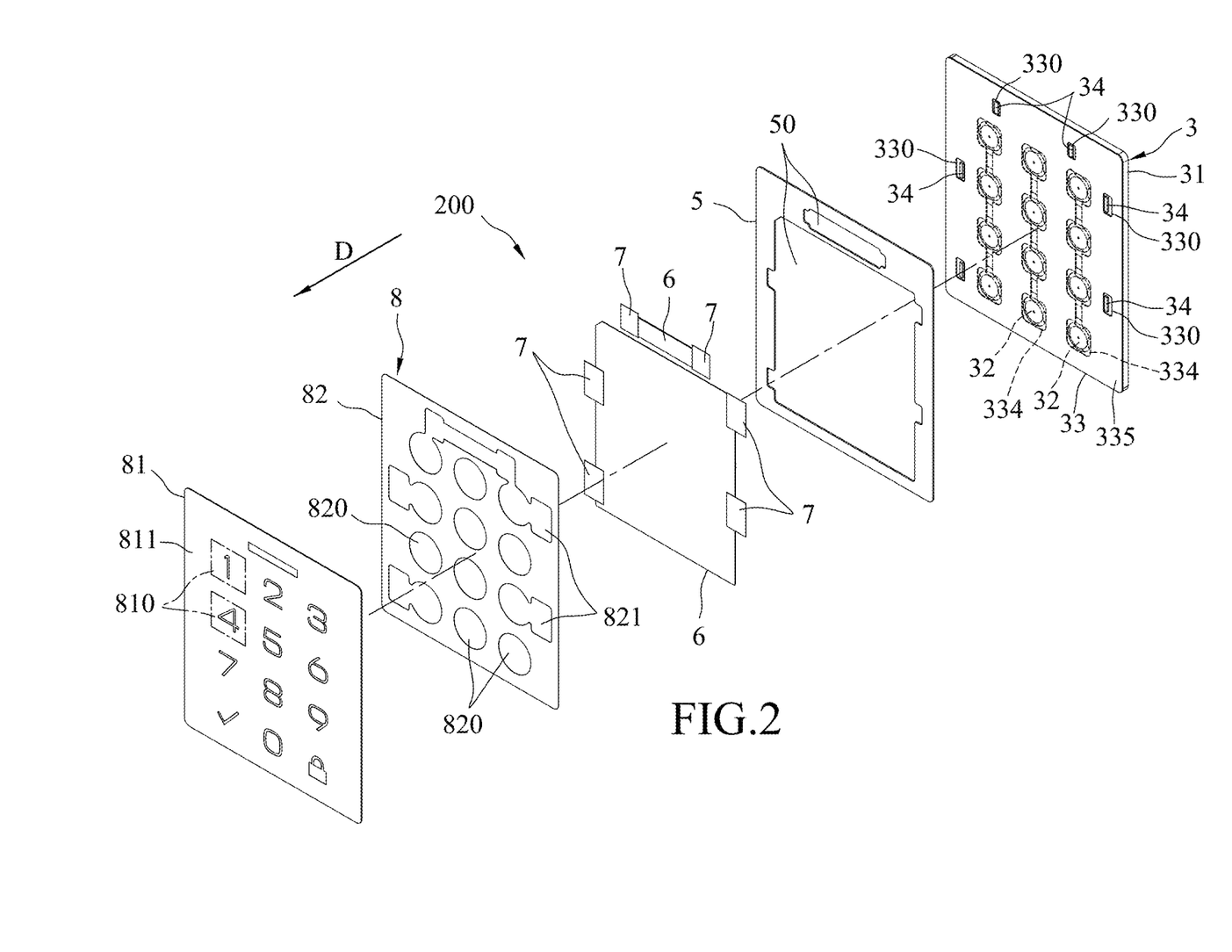
FIG. 2 is an exploded perspective view of the first embodiment.

Referring to FIGS. 1 and 2, a first embodiment of a membrane touch panel device 200 according to the disclosure is adapted to be electrically connected to an electronic device (not shown), and is operable to transmit command signals to the electronic device. The electronic device is, for example, but not limited to, an electronic lock. The membrane touch panel device 200 includes a circuit board unit 3, an opaque light-blocking frame plate 5, two optical film units 6, a plurality of opaque light-blocking tabs 7, and an operation panel unit 8 that are stacked along a front-rear direction (D).

Figure 3:
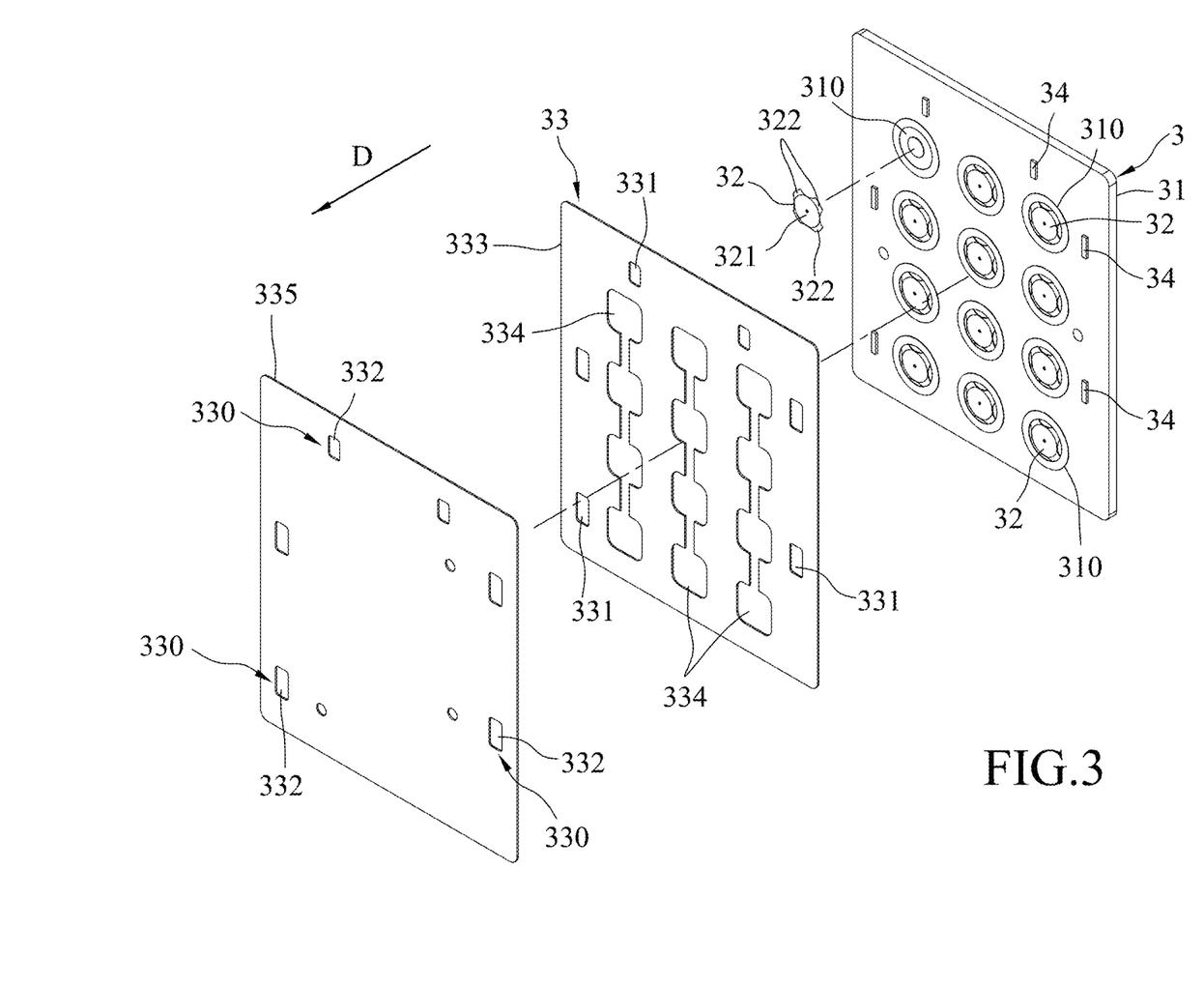
FIG. 3 is an exploded perspective view illustrating a circuit board unit of the first embodiment.
Figure 4:
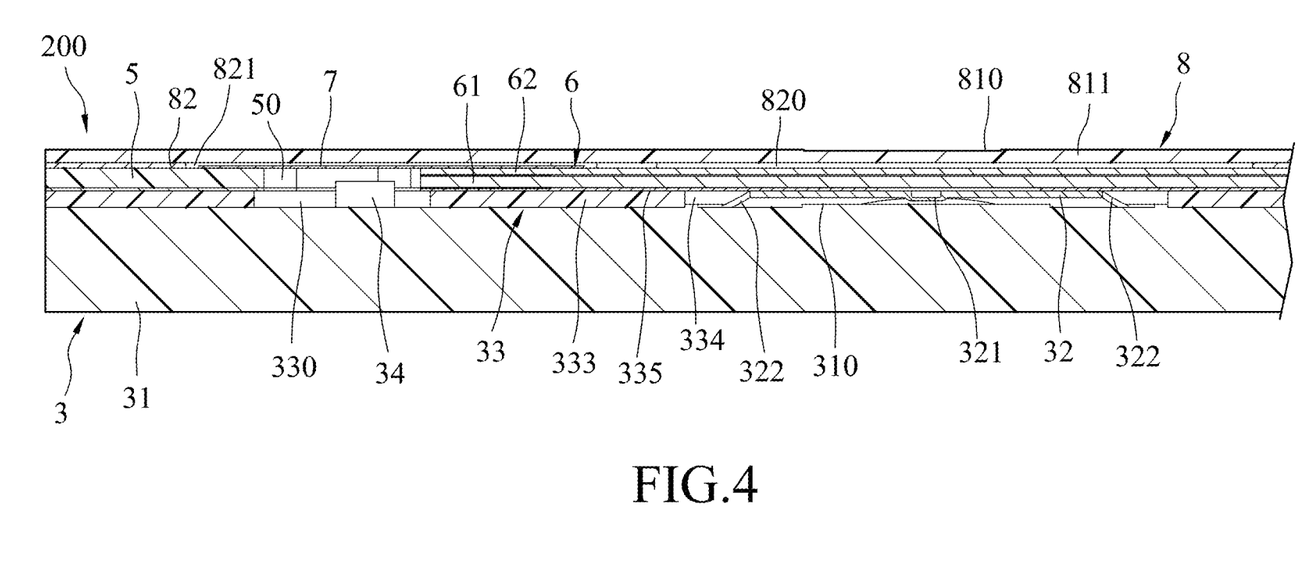
FIG. 4 is a fragmentary cross-sectional view of the first embodiment.

Referring to FIGS. 2, 3, and 4, the circuit board unit 3 includes a circuit board 31 having a plurality of keypad circuits 310 that are disposed on a front side of the circuit board 31, a plurality of buttons 32 respectively disposed on the keypad circuits 310 of the circuit board 31, a plurality of LEDs 34 being electrically connected to the front side of the circuit board 31, and surrounding the buttons 32, and a fixing plate module 33 stacked on the front side of the circuit board 31, and configured for positioning the buttons 32 to the circuit board 31. In the present embodiment, the keypad circuits 310 are arranged in a 4-by-3 array (i.e., four rows and three columns), but are not limited thereto.

In the present embodiment, a light transmittance rate of the circuit board 31 ranges from 0% to 15% (but may range from 0% to 20% in other embodiments of the disclosure), which substantially prevents light generated by or scattered from the LEDs 34 from transmitting through a rear side and a peripheral edge of the circuit board 31 to the external environment. In the present embodiment, the circuit board 31 is a black circuit board coated with a black solder mask; however, in other embodiments of the disclosure, other circuit board materials with a light transmittance rate within the above-mentioned range may also be adopted.

Each of the buttons 32 has a thin plate-shaped conductive portion 321, and a plurality of resilient tab portions 322 extending outwardly and rearwardly from a peripheral edge of the conductive portion 321. The resilient tab portions 322 of each of the buttons 32 abut against the front side of the circuit board 31, such that the conductive portion 321 of each of the buttons 32 is disposed in front of and spaced apart from the respective one of the keypad circuits 310. When each of the buttons 32 is pressed, the resilient tab portions 322 thereof resiliently deform, allowing the conductive portion 321 thereof to move toward and be electrically connected to the respective one of the keypad circuits 310, thereby triggering the circuit board 31 to generate a corresponding signal. However, the configuration of the buttons 32 may vary in variations of the embodiment, and is not limited to the above-mentioned.

The LEDs 34 are disposed proximal to a peripheral edge of the circuit board 31 and surround the keypad circuits 310. In the present embodiment, some of the LEDs 34 (hereinafter referred to as the upper LEDs 34) are disposed above the keypad circuits 310, and the rest of the LEDs 34 (hereinafter referred to as the lower LEDs 34) are distributed on left and right sides of the keypad circuits 310; the left and right LEDs are staggered with each other along a left-right direction. Specifically, the LEDs 34 in the present embodiment are side-emitting type LEDs. Each of the left or right LEDs 34 is aligned with a respective row of the keypad circuits 310 along the left-right direction, and is configured to emit light toward the respective row of the keypad circuits 310 along the left-right direction.

The fixing plate module 33 is fixedly connected to the front side of the circuit board 31, covers the buttons 32, and has a plurality of through holes 330 that are respectively provided for the LEDs 34 to protrude forwardly therethrough.

Specifically, the fixing plate module 33 includes a limit frame plate 333 and a fixed shading plate 335. The limit frame plate 333 is fixedly stacked (i.e., adhesively bonded to) on the front side of the circuit board 31, and has a plurality of limit holes 334 that extend therethrough along the front-rear direction (D), and that respectively receive the buttons 32 and position the buttons 32 to the circuit board 31. The fixed shading plate 335 is fixedly stacked (i.e., adhesively bonded to) on a front side of the limit frame plate 333, covers the limit holes 334, and is pressable and resiliently deformable for pushing the buttons 32. Each of the through holes 330 of the fixing plate module 33 has a rear hole section 331 formed in the limit frame plate 333, and a front hole section 332 formed in the fixed shading plate 335.

The light-blocking frame plate 5 is fixedly stacked (i.e., adhesively bonded to) on a front side of the fixed shading plate 335 of the fixing plate module 33 with the buttons 32 and the LEDs 34 being exposed from the hollow section 50 thereof. Specifically, the light-blocking frame plate 5 defines two hollow sections 50 that are spaced apart from each other in an up-down direction. The upper one of the hollow sections 50 (hereinafter referred to as the upper hollow section 50) is provided for the upper LEDs 34 to protrude forwardly thereinto. The lower one of the hollow sections 50 (hereinafter referred to as the lower hollow section 50) is larger than the upper, and is provided for the buttons 32 and the lower LEDs 34 to protrude forwardly thereinto; that is, a peripheral end of the lower hollow section 50 surrounds the buttons 32 and the lower LEDs 34. The light-blocking frame plate 5 is adapted to prevent the light generated by the LEDs 34 from leaking out along the up-down and left-right directions. In the present embodiment, the light-blocking frame plate 5 is, but not limited to, a black polyethylene terephthalate (PET) sheet having a thickness of 300±5 μm.

The optical film units 6 are disposed in the hollow sections 50 of the light-blocking frame plate 5, respectively. Specifically, one of the optical film units 6 in the upper hollow section 50 is disposed between the upper LEDs 34, and the other one of the optical film units 6 in the lower hollow section 50 is disposed in front of the buttons 32 and between the lower LEDs 34 along the left-right direction. A peripheral edge of each of the optical film units 6 is configured to face light emitting sides of the corresponding LEDs 34 such that the optical film units 6 are adapted to guide and diffuse the light generated by the LEDs 34 forwardly therethrough.

In the present embodiment, each of the optical film units 6 includes a guiding film 61 and a diffusion film 62 that are stacked along the front-rear direction (D). For each of the optical film units 6, the guiding film 61 is adapted to guide the light of the corresponding LEDs 34 forward to the diffusion film 62, and the diffusion film 62 is adapted to diffuse the light forward evenly. Since configurations of the guiding film 61 and the diffusion film 62 are not the subject of the present disclosure and may vary greatly in variations of the embodiment, they will not be described in further detail hereafter.

In the present embodiment, there are six of the light-blocking tabs 7. Each of the light-blocking tabs 7 is fixedly connected between and bridges the front side of the light-blocking frame plate 5 and a front side of a corresponding one of the optical film units 6, and covers a respective one of the LEDs 34 for blocking the light of the LEDs 34 from being scattered forward. In the present embodiment, the light-blocking tabs 7 are, but not limited to, black polyethylene terephthalate (PET) sheet having a thickness of 35±5 μm.

Figure 5:
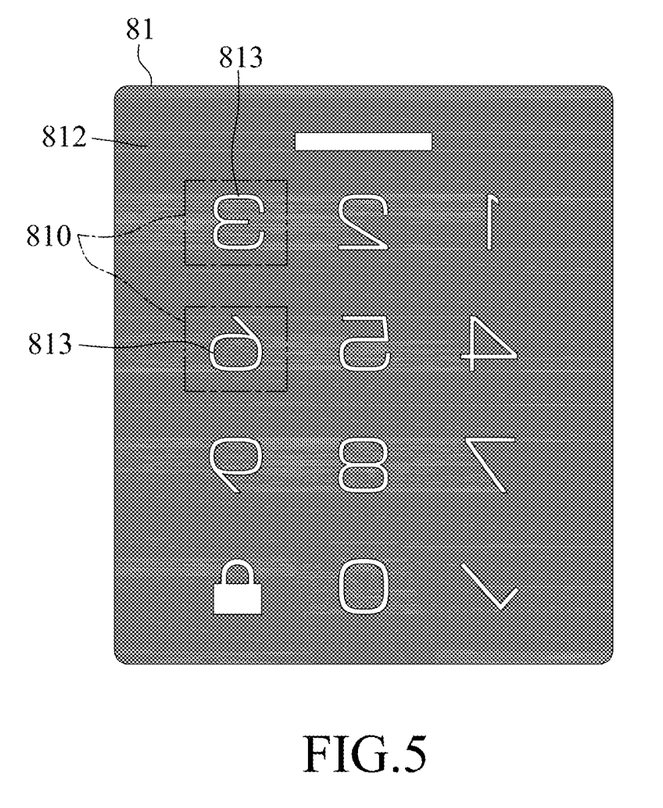
FIG. 5 is a rear view illustrating an operation panel unit of the first embodiment.

Referring to FIGS. 1, 2, and 5, the operation panel unit 8 is fixedly stacked on the front side of the light-blocking frame plate 5, and has a plurality of key segments 810 that are respectively aligned with the buttons 32 along the front-rear direction (D). Each of the key segments 810 is pressable to drive the corresponding one of the optical film units 6 and the fixing plate module 33 to resiliently deform rearward, thereby pushing a respective one of the buttons 32, so that the respective one of the buttons 32 makes electrical connection with and triggers a respective one of the keypad circuits 310.

The operation panel unit 8 includes a face panel 81 that defines the key segments 810, and a keypad plate 82 that is fixedly stacked behind the face panel 81. The keypad plate 82 is made of an opaque material, is fixedly connected to the front side of the light-blocking frame plate 5, and has a plurality of operating holes 820 and a plurality of embedding holes 821. The operating holes 820 extend through the keypad plate 82 along the front-rear direction (D), are disposed in front of the hollow sections 50, and are respectively aligned with the key segments 810, each of which is capable of resiliently deforming into a respective one of the operating holes 820 to make electrical connection with and trigger a respective one of the keypad circuits 310. The embedding holes 821 extend through the keypad plate 82 along the front-rear direction (D), and are provided for the light-blocking tabs 7 to be embedded respectively therein.

The face panel 81 has a light-transmitting translucent plate 811, and an opaque light-blocking paint layer 812 that is coated on a rear side of the translucent plate 811, and that is patterned such that the rear side of the translucent plate 811 is partially exposed from the light-blocking paint layer 812 to form a plurality of light-transmitting symbols 813 that are respectively aligned with the operating holes 820, and that are adapted to permit light to pass forwardly. Each of the symbols 813 is a part of the translucent plate 811 that is exposed from the light-blocking paint layer 812, and cooperates with the light-blocking paint layer 812 to define a respective one of the key segments 810. The symbols 813 are numerals, English letters or other symbols.

Referring to FIGS. 1, 2, and 4, when the present embodiment of the membrane touch panel device 200 is used with an electronic device (not shown) with a power supply, and when the LEDs 34 are controlled to emit light, the light is emitted toward the peripheral edge of each of the optical film units 6, is guided by the guiding film 61 of each of the optical film units 6, is diffused by the diffusion film 62 of each of the optical film units 6 forward to the operation panel unit 8, and passes forwardly through the operating holes 820 of the operation panel unit 8 and finally through the symbols 813, resulting in illumination of the key segments 810.

When a user presses one of the key segments 810, the key segment 810 resiliently deforms into a respective one of the operating holes 820, causing the fixing plate module 33 and the lower one of the optical film units 6 to resiliently deform rearwards to press against a respective one of the buttons 32, such that the respective one of the buttons 32 makes electrical connection with and triggers a respective one of the keypad circuits 310, thereby triggering the circuit board 31 to generate a corresponding signal.

Since the circuit board 31 has a low light transmission rate, the light of the LEDs 34 is mostly prevented from leaking backwards. Further, since the LEDs 34 are surrounded by the light-blocking frame plate 5, which is stacked between the circuit board 31 and the operation panel unit 8, the light of the LEDs 34 is also prevented from leaking sideways. As such, the light of the LEDs 34 is mostly guided forward by the optical film units 6, and then emitted out through the key segments 810 of the operation panel unit 8, and light leakages, both backwards and sideways, are greatly reduced.

Figure 6:
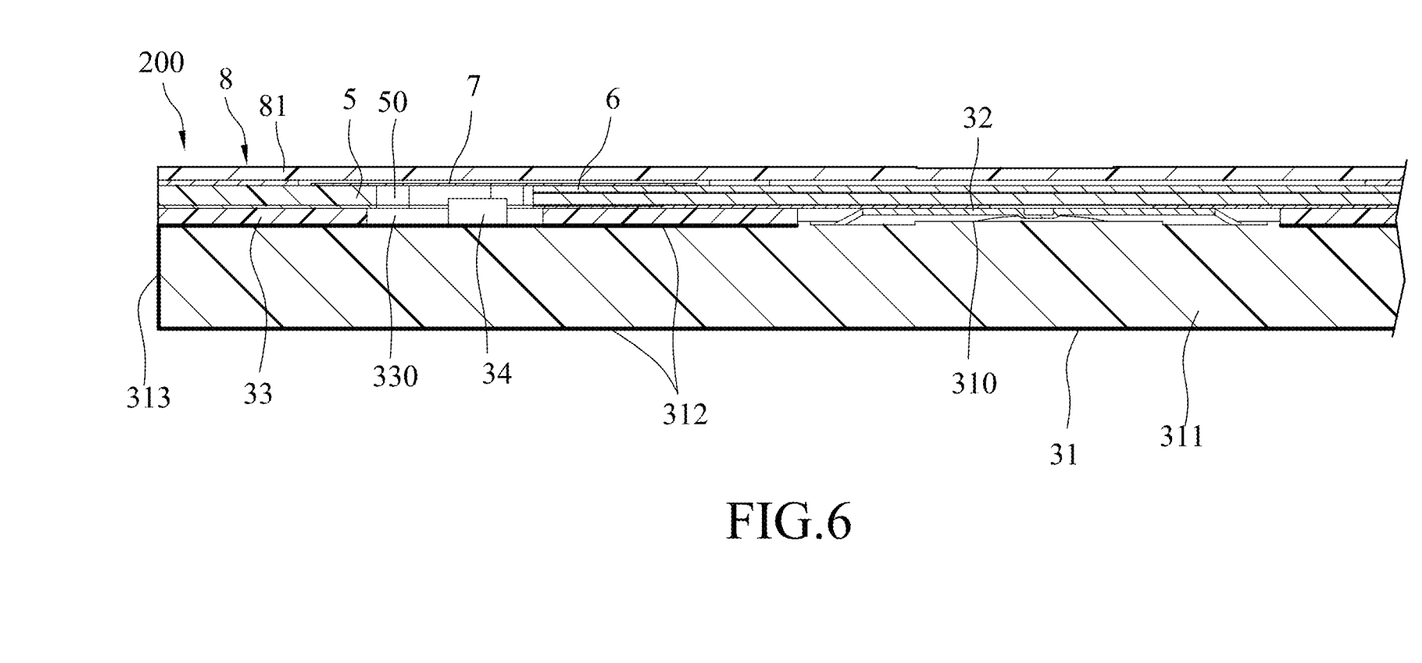
FIG. 6 is a fragmentary cross-sectional view of a second embodiment of the membrane touch panel device according to the disclosure.

Referring to FIG. 6, a second embodiment of the membrane touch panel device 200 according to the disclosure is similar to the first embodiment, and the difference between the two resides in the configuration of the circuit board 31 as described below.

In the second embodiment, the circuit board 31 has a main panel 311 that is provided with the keypad circuits 310, two first light-blocking paint layers 312 that are opaque and that are respectively coated on front and rear sides of the main panel 311 without covering the keypad circuit 310, and a second light-blocking paint layer 313 that is opaque and that is coated on a peripheral edge of the main panel 311 connecting between the front and rear sides of the main panel 311.

In the present embodiment, the main panel 311 is a common green circuit board with high light transmission rate. However, in variations of the embodiment, the main panel 311 may be, but not limited to, a black circuit board with low light transmission rate, such as that described in the first embodiment. The first light-blocking paint layers 312 are, but not limited to, PCB ink layers manufactured by Nan Ya Plastic Industry Co., Ltd. (e.g., product number 14LP-4G (K-63AU), 5LP-4G (K-65), 16LP-4G (K-65M), and 26P-02L). The second light-blocking paint layer 313 is a copper paint layer (or other metallic paint layer in variations of the embodiment).

By virtue of the configurations of the first light-blocking paint layers 312 and the second light-blocking paint layer 313 of the circuit board 31, the light transmission rate of the circuit board 31 can be maintained between 0% and 15% (or between 0% and 20% in variations of the embodiment), thereby effectively preventing light leakage.

Figure 7:
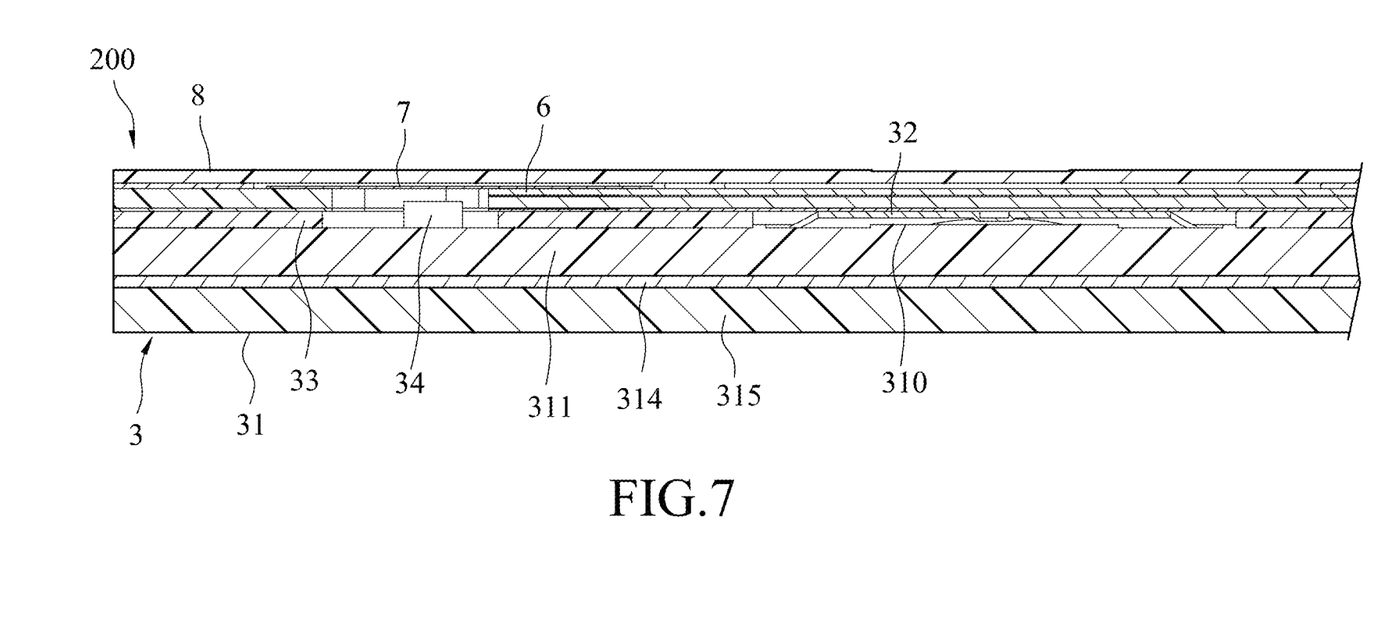
FIG. 7 is a fragmentary cross-sectional view of a third embodiment of the membrane touch panel device according to the disclosure.

Referring to FIG. 7, a third embodiment of the membrane touch panel device 200 according to the disclosure is also similar to the first embodiment, and the difference between the two also resides in the configuration of the circuit board 31 as described below.

In the third embodiment, the circuit board 31 is a multi-layer circuit board, and has a back panel 315, a light-blocking panel 314, and a main panel 311 that are stacked along the front-rear direction (D). The main panel 311 is provided with the keypad circuits 310. The light-blocking panel 314 is disposed between the back panel 315 and the main panel 311, and is made of an opaque material (e.g., metal). The back panel 315 is provided with a control circuit (not shown) that extends through the light-blocking panel 314 and that is electrically connected to the keypad circuits 310. Since the electrical connection between the main panel 311 and the back panel 315 is well known in the art, it will not be further described hereinafter.

By virtue of the circuit board 31 having a layered structure that includes the light-blocking panel 314, the light of the LEDs 34 is prevented from penetrating backward, and light leakage can be effectively prevented.

Figure 8:
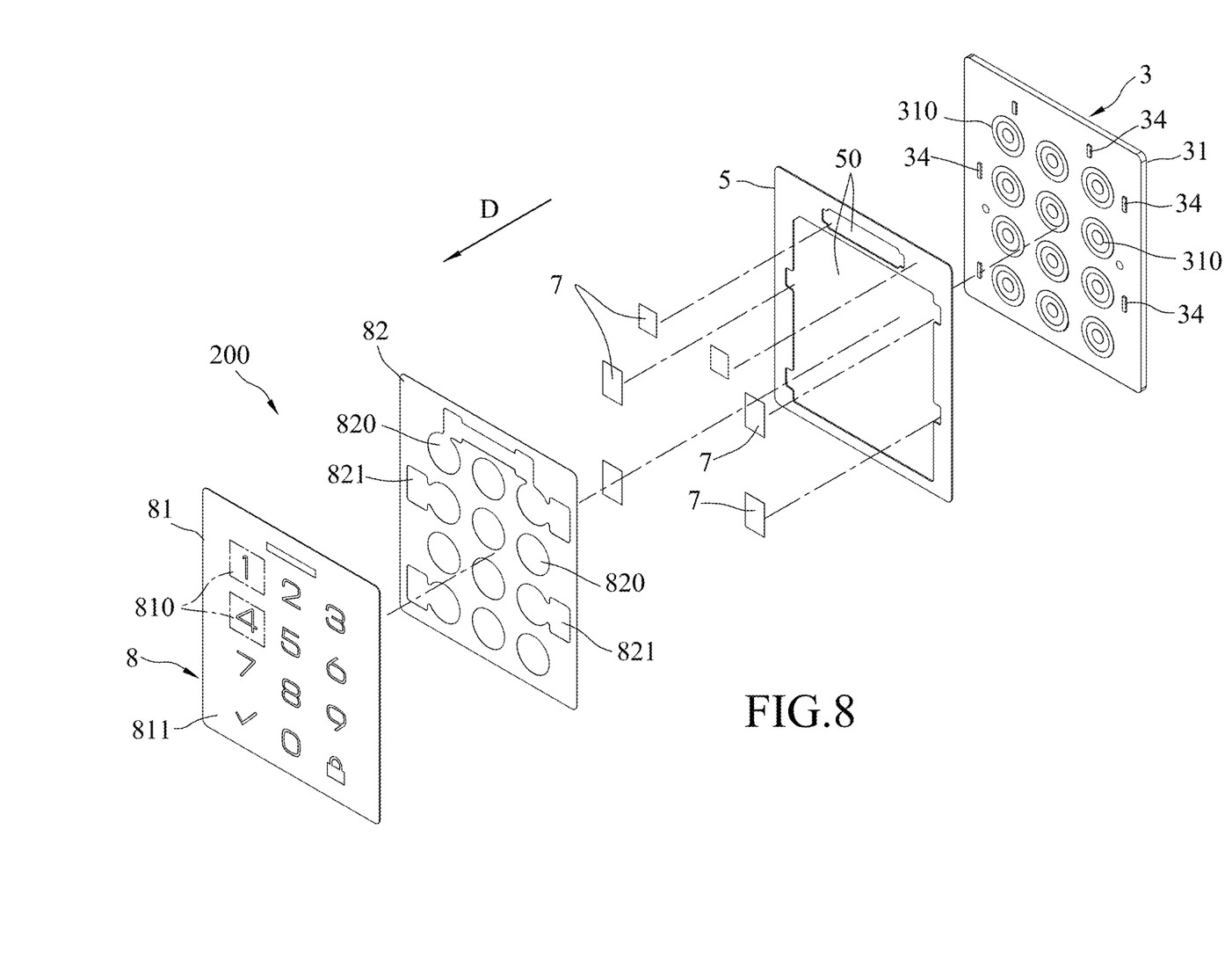
FIG. 8 is an exploded perspective view of a fourth embodiment of the membrane touch panel device according to the disclosure.
Figure 9:
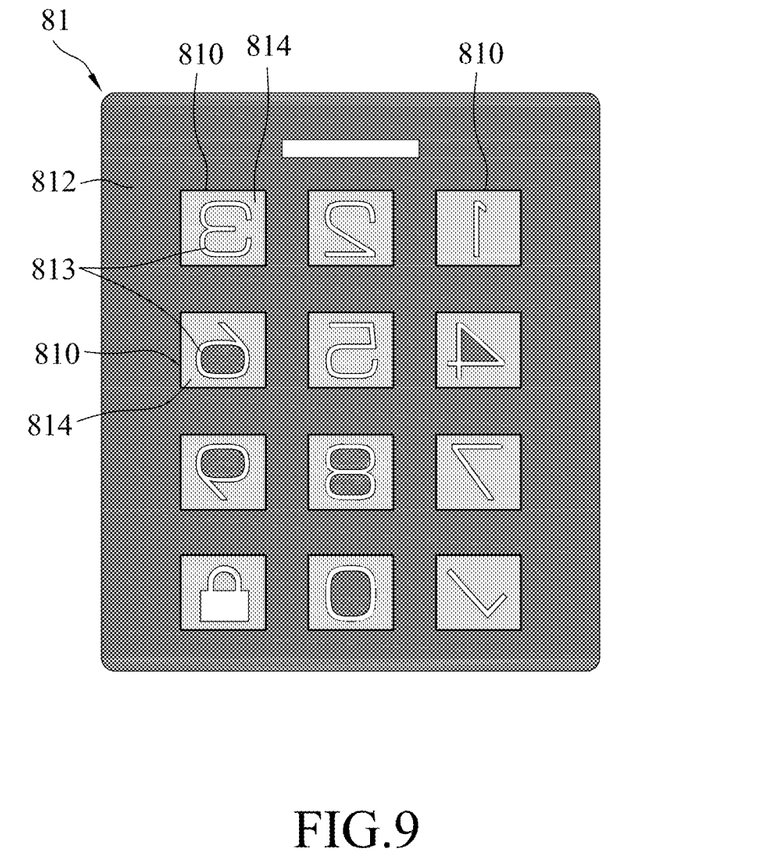
FIG. 9 is a rear view illustrating the operation panel unit of the fourth embodiment.
Figure 10:
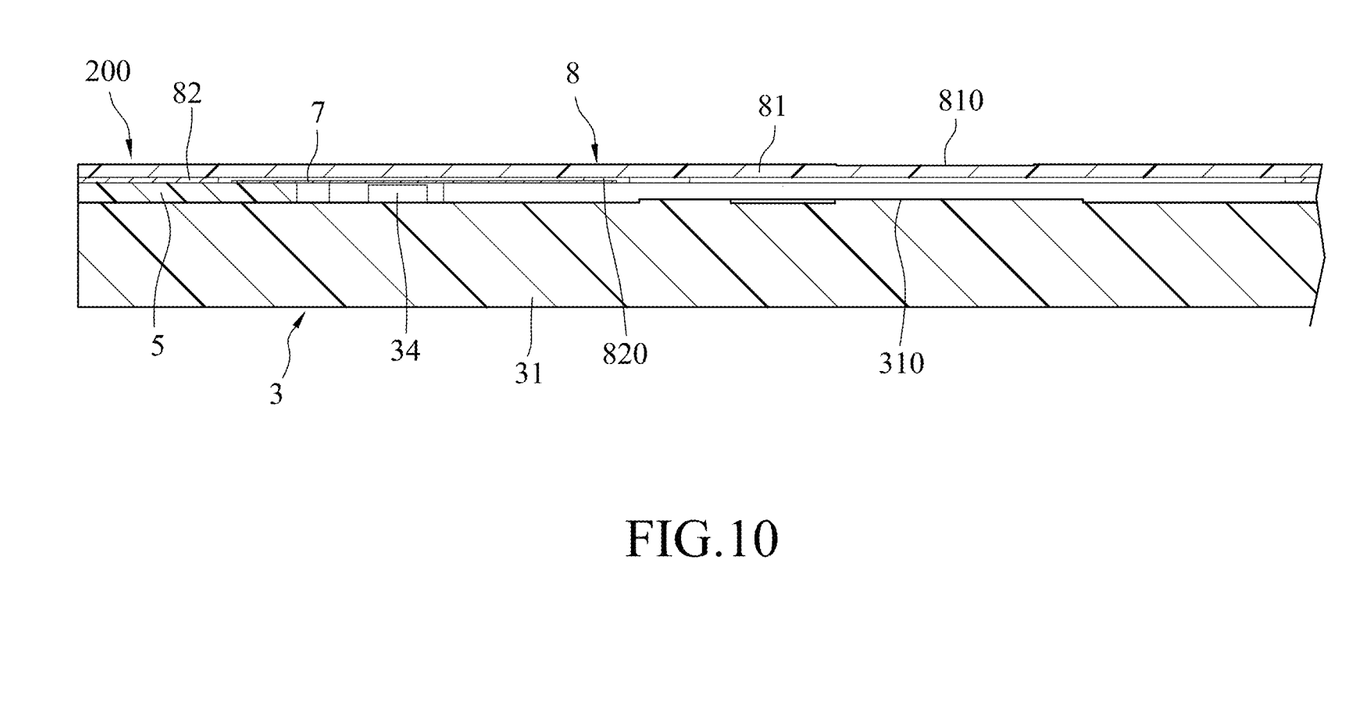
FIG. 10 is a fragmentary cross-sectional view of the fourth embodiment.

Referring to FIGS. 8, 9, and 10, a fourth embodiment of the membrane touch panel device 200 according to the disclosure is similar to the first embodiment, and the main difference between the two resides in the configurations of the circuit board unit 3 and the operation panel unit 8, and the omission of the optical film units 6.

In the fourth embodiment, the circuit board unit 3 only includes the circuit board 31 and the LEDs 34. The front side of the circuit board 31 is provided with the keypad circuits 310, and the light transmittance rate of the circuit board 31 ranges from 0% to 15%. The LEDs 34 are distributed around the keypad circuits 310.

The light-blocking frame plate 5 is fixedly stacked on the front side of the circuit board 31, and surrounds the keypad circuits 310 and the LEDs 34. The light-blocking tabs 7 are fixedly connected to the front side of the light-blocking frame plate 5, and cover the front sides of the LEDs 34.

The operation panel unit 8 includes a face panel 81 that defines the key segments 810 and that is pressable, and an opaque keypad plate 82 that is stacked behind the face panel 81. The keypad plate 82 has a plurality of operating holes 820 that extend therethrough along the front-rear direction (D), that are disposed in front of the hollow section 50, and that are respectively aligned with the key segments 810, and a plurality of embedding holes 821 that extend therethrough along the front-rear direction (D), and that are provided for the light-blocking tabs 7 to be embedded respectively therein.

The face panel 81 has a light-transmitting translucent plate 811, an opaque light-blocking paint layer 812, and a plurality of spaced apart conductive film members 814 that are stacked along the front-rear direction (D). The light-blocking paint layer 812 is coated on a rear side of the translucent plate 811 and is patterned such that the rear side of the translucent plate 811 is partially exposed from the light-blocking paint layer 812 to form a plurality of light-transmitting symbols 813 that are respectively aligned with the operating holes 820 (i.e., each of the symbols 813 is a part of the translucent plate 811 that is exposed from the light-blocking paint layer 812). The conductive film members 814 are disposed behind the light-blocking paint layer 812 (i.e., fixed at a rear side of the light-blocking paint layer 812) and are aligned with the symbols 813. Each of the conductive film members 814 is patterned so that it uncovers and surrounds a respective one of the symbol 813. Each of the conductive film members 814 and the respective one of the symbols 813 cooperate with the light-blocking paint layer 812 to define a respective one of the key segments 810. Each of the key segments 810 is pressable and capable of resiliently deforming into a respective one of the operating holes 820 so as to make electrical connection with and triggering a respective one of the keypad circuits 310 via a respective one of the conductive film members 814.

By virtue of the configurations of the light-blocking paint layer 812 of the face panel 81, the light-blocking frame plate 5 surrounding the LEDs 34, and the light-blocking tabs 7 covering the front side of the LEDs 34, light leakage can also be effectively prevented for the present embodiment.

In summary, by virtue of the circuit board unit 3, the light-blocking frame plate 5 and the operation panel unit 8 being stacked along the front-rear direction (D), and the low light transmission rate of the circuit board 31, the light generated by the LEDs 34 is prevented from penetrating backwardly through and leaking out from the circuit board 31. Furthermore, by virtue of the light-blocking frame plate 5 surrounding the LEDs 34, and the light-blocking tabs 7 covering the front sides of the LEDs 34, the light generated by the LEDs 34 is effectively prevented from leaking out from the gaps among the circuit board unit 3, the light-blocking frame plate 5 and the operation panel unit 8. Therefore, compared with the prior art, the membrane touch panel device 200 of the present disclosure is able to resolve the issue of light leakage, and thereby enhances an overall quality of the device.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what (is)are considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A membrane touch panel device comprising:
   a circuit board unit, an opaque light-blocking frame plate, a plurality of opaque light-blocking tabs, and an operation panel unit that are stacked along a front-rear direction;
   wherein said circuit board unit includes a circuit board having a plurality of keypad circuits that are disposed on a front side of said circuit board, and a plurality of LEDs being electrically connected to said front side of said circuit board;
   wherein said light-blocking frame plate is stacked on said front side of said circuit board, and defines a hollow section provided for said LEDs to protrude forwardly thereinto;
   wherein said light-blocking tabs are connected to a front side of said light-blocking frame plate such that said light-blocking tabs respectively cover said LEDs;
   wherein said operation panel unit is fixedly stacked on said front side of said light-blocking frame plate, and has a plurality of key segments that are respectively aligned with said keypad circuits along the front-rear direction, and that are adapted to permit light generated by said LEDs and emitted through said hollow section to pass forwardly therethrough; and
   wherein said circuit board further has a main panel that is provided with said keypad circuits, two first light-blocking paint layers that are respectively coated on front and rear sides of said main panel, and a second light-blocking paint layer that is opaque and that is coated on a peripheral edge of said main panel connecting between said front and rear sides of said main panel.

2. The membrane touch panel device of claim 1, wherein said second light-blocking paint layer is a metallic paint layer.

3. A membrane touch panel device comprising:
   a circuit board unit, an opaque light-blocking frame plate, a plurality of opaque light-blocking tabs, and an operation panel unit that are stacked along a front-rear direction;
   wherein said circuit board unit includes a circuit board having a plurality of keypad circuits that are disposed on a front side of said circuit board, and a plurality of LEDs being electrically connected to said front side of said circuit board;
   wherein said light-blocking frame plate is stacked on said front side of said circuit board, and defines a hollow section provided for said LEDs to protrude forwardly thereinto;

wherein said light-blocking tabs are connected to a front side of said light-blocking frame plate such that said light-blocking tabs respectively cover said LEDs;

wherein said operation panel unit is fixedly stacked on said front side of said light-blocking frame plate, and has a plurality of key segments that are respectively aligned with said keypad circuits along the front-rear direction, and that are adapted to permit light generated by said LEDs and emitted through said hollow section to pass forwardly therethrough; and wherein said circuit board further has a back panel, an opaque light-blocking panel, and a main panel that are stacked along the front-rear direction, said light-blocking panel being disposed between said back panel and said main panel, said main panel being provided with said keypad circuits, said back panel being provided with a control circuit that extends through said light-blocking panel and that is electrically connected to said keypad circuits.

4. A membrane touch panel device comprising:

a circuit board unit, an opaque light-blocking frame plate, a plurality of opaque light-blocking tabs, and an operation panel unit that are stacked along a front-rear direction;

wherein said circuit board unit includes a circuit board having a plurality of keypad circuits that are disposed on a front side of said circuit board, and a plurality of LEDs being electrically connected to said front side of said circuit board;

wherein said light-blocking frame plate is stacked on said front side of said circuit board, and defines a hollow section provided for said LEDs to protrude forwardly thereinto;

wherein said light-blocking tabs are connected to a front side of said light-blocking frame plate such that said light-blocking tabs respectively cover said LEDs;

wherein said operation panel unit is fixedly stacked on said front side of said light-blocking frame plate, and has a plurality of key segments that are respectively aligned with said keypad circuits along the front-rear direction, and that are adapted to permit light generated by said LEDs and emitted through said hollow section to pass forwardly therethrough; and wherein said operation panel unit includes a face panel defining said key segments, and an opaque keypad plate stacked behind said face panel, said keypad plate having a plurality of operating holes that extend therethrough along the front-rear direction, that are disposed in front of said hollow section, and that are respectively aligned with said key segments, and a plurality of embedding holes that extend therethrough along the front-rear direction, and that are provided for said light-blocking tabs to be embedded respectively therein, each of said key segments being pressable and capable of resiliently deforming into a respective one of said operating holes to make electrical connection with and trigger a respective one of said keypad circuits.

5. The membrane touch panel device of claim 4, wherein said face panel has a light-transmitting translucent plate, an opaque light-blocking paint layer, and a plurality of spaced apart conductive film members, said light-blocking paint layer being coated on a rear side of said translucent plate and being patterned such that said rear side of said translucent plate is partially exposed from said light-blocking paint layer to form a plurality of light-transmitting symbols that are respectively aligned with said operating holes, each of said symbols being a part of said translucent plate that is exposed from said light-blocking paint layer, said conductive film members being disposed behind said light-blocking paint layer, each of said conductive film members surrounding one of said symbols, one of said conductive film members and one of said symbols cooperating with said light-blocking paint layer to define one of said key segments, each of said key segments making electrical connection with and triggering a respective one of said keypad circuits via a respective one of said conductive film members.

6. The membrane touch panel device of claim 4, wherein said circuit board is a black circuit board coated with a black solder mask.

7. The membrane touch panel device of claim 4, further comprising an optical film unit disposed in said hollow section of said light-blocking frame plate, and adapted to guide and diffuse light generated by said LEDs forwardly therethrough.

8. The membrane touch panel device of claim 7, wherein each of said light-blocking tabs is fixedly connected between and bridges said front side of said light-blocking frame plate and a front side of said optical film unit.

9. The membrane touch panel device of claim 7, wherein said circuit board unit further includes a plurality of buttons respectively disposed on said keypad circuits of said circuit board, and a fixing plate module stacked on said front side of said circuit board, configured for positioning said buttons to said circuit board, and having a plurality of through holes that are respectively provided for said LEDs to protrude forwardly therethrough, said light-blocking frame plate being stacked on a front side of said fixing plate module with said buttons and said LEDs being exposed from said hollow section thereof, each of said key segments being aligned with a respective one of said buttons, and being pressable to push the respective one of said buttons so as to trigger a respective one of said keypad circuits.

10. The membrane touch panel device of claim 4, wherein said LEDs are side-emitting type LEDs.

11. A membrane touch panel device comprising:

a circuit board unit, an opaque light-blocking frame plate, a plurality of opaque light-blocking tabs, and an operation panel unit that are stacked along a front-rear direction;

wherein said circuit board unit includes a circuit board having a plurality of keypad circuits that are disposed on a front side of said circuit board, and a plurality of LEDs being electrically connected to said front side of said circuit board;

wherein said light-blocking frame plate is stacked on said front side of said circuit board, and defines a hollow section provided for said LEDs to protrude forwardly thereinto;

wherein said light-blocking tabs are connected to a front side of said light-blocking frame plate such that said light-blocking tabs respectively cover said LEDs;

wherein said operation panel unit is fixedly stacked on said front side of said light-blocking frame plate, and has a plurality of key segments that are respectively aligned with said keypad circuits along the front-rear direction, and that are adapted to permit light generated by said LEDs and emitted through said hollow section to pass forwardly therethrough; and wherein said circuit board unit further includes a plurality of buttons respectively disposed on said keypad circuits of said circuit board, and a fixing plate module stacked on said front side of said circuit board, configured for positioning said buttons to said circuit board, and having a plurality of through holes that are respectively provided for said LEDs to protrude forwardly therethrough, said light-blocking frame plate being stacked on a front side of said fixing plate module with said buttons and said LEDs being exposed from said hollow section thereof, each of said key segments being aligned with a respective one of said buttons, and being pressable to push said respective one of said buttons.

12. The membrane touch panel device of claim 11, wherein said operation panel unit includes a face panel defining said key segments, and an opaque keypad plate stacked behind said face panel, said keypad plate having a plurality of operating holes that extend therethrough along the front-rear direction, that are disposed in front of said hollow section, and that are respectively aligned with said key segments, and a plurality of embedding holes that extend therethrough along the front-rear direction, and that are provided for said light-blocking tabs to be embedded respectively therein, each of said key segments being pressable and capable of resiliently deforming into a respective one of said operating holes to trigger a respective one of said keypad circuits.

13. The membrane touch panel device of claim 12, wherein said face panel has a light-transmitting translucent plate and an opaque light-blocking paint layer, said light-blocking paint layer being coated on a rear side of said translucent plate, and being patterned such that said rear side of said translucent plate is partially exposed from said light-blocking paint layer to form a plurality of light-transmitting symbols that are respectively aligned with said operating holes, each of said symbols being a part of said translucent plate that is exposed from said light-blocking paint layer, said symbols cooperating with said light-blocking paint layer to define said key segments.

14. The membrane touch panel device of claim 11, wherein said fixing plate module includes a limit frame plate and a fixed shading plate, said limit frame plate being stacked on said front side of said circuit board, and having a plurality of limit holes that extend therethrough along the front-rear direction, and that respectively receive said buttons, said fixed shading plate being stacked on a front side of said limit frame plate, and covering said limit holes, each of said through holes of said fixing plate module having a rear hole section formed in said limit frame plate, and a front hole section formed in said fixed shading plate.

15. The membrane touch panel device of claim 11, wherein said circuit board is a black circuit board coated with a black solder mask.

16. The membrane touch panel device of claim 11, further comprising an optical film unit disposed in said hollow section of said light-blocking frame plate, and adapted to guide and diffuse light generated by said LEDs forwardly therethrough.

17. The membrane touch panel device of claim 16, wherein each of said light-blocking tabs is fixedly connected between and bridges said front side of said light-blocking frame plate and a front side of said optical film unit.

18. The membrane touch panel device of claim 16, wherein each of said key segments is pressable to push the respective one of said buttons so as to trigger a respective one of said keypad circuits.

19. The membrane touch panel device of claim 11, wherein said LEDs are side-emitting type LEDs.

* * * * *